United States Patent
Lopez Torres et al.

(10) Patent No.: US 7,405,820 B2
(45) Date of Patent: Jul. 29, 2008

(54) OPTICAL SPECTRUM ANALYZING DEVICE BY MEANS OF BRILLOUIN SCATTERING AND ASSOCIATED MEASUREMENT PROCESS

(75) Inventors: Francisco M. Lopez Torres, Zaragoza (ES); Carlos Heras Vila, Zaragoza (ES); Pilar Blasco Herranz, Zaragoza (ES); Juan Ignacio Garces Gregorio, Zaragoza (ES); Rafael Alonso Esteban, Zaragoza (ES); Francisco Villuendas Yuste, Zaragoza (ES); Jesús Subias Domingo, Zaragoza (ES); Francisco Javier Pelayo Zueco, Zaragoza (ES)

(73) Assignee: Fibercom S.L., Zaragoza (ES)

( * ) Notice: Subject to any disclaimer, the term of this patent is extended or adjusted under 35 U.S.C. 154(b) by 408 days.

(21) Appl. No.: 10/534,884

(22) PCT Filed: Jul. 25, 2003

(86) PCT No.: PCT/ES03/00392

§ 371 (c)(1),
(2), (4) Date: May 13, 2005

(87) PCT Pub. No.: WO2004/044538

PCT Pub. Date: May 27, 2004

(65) Prior Publication Data

US 2006/0109451 A1     May 25, 2006

(30) Foreign Application Priority Data

Nov. 14, 2002   (ES) .................................. 200202617

(51) Int. Cl.
*G01J 3/00*     (2006.01)
*G02B 6/00*     (2006.01)

(52) U.S. Cl. ...................... 356/300; 356/73.1; 385/122; 398/152

(58) Field of Classification Search ......... 356/300–303, 356/73.1, 319, 322, 326, 327; 385/122; 398/152, 398/28, 29
See application file for complete search history.

(56) References Cited

U.S. PATENT DOCUMENTS 4,977,620 A * 12/1990 Smith et al. ................. 398/203

(Continued)

FOREIGN PATENT DOCUMENTS

EP     1199549     4/2002

(Continued)

*Primary Examiner*—L. G Lauchman
(74) *Attorney, Agent, or Firm*—Sughrue Mion, PLLC

(57) ABSTRACT

The invention relates to a device which is used for the spectral analysis of optical signals and which is based on the stimulated Brillouin scattering effect. The invention also relates to the associated measurement method which makes use of the optical signal amplification caused by the Brillouin scattering effect. The Brillouin scattering effect enables the selective optical amplification of a determined component of the optical spectrum of the signal to be analysed, known as the problem signal, for the measurement thereof with a determined dynamic range, sensitivity and resolution. According to the invention, the problem signal is introduced into an optical fibre together with a narrowband optical signal, known as the probe signal, with a determined wavelength. Said probe signal propagates in the opposite direction to that of the problem signal, such that both signals interact inside the fibre owing to the Brillouin effect.

21 Claims, 3 Drawing Sheets

U.S. PATENT DOCUMENTS

| | | | |
|---|---|---|---|
| 5,144,374 A * | 9/1992 | Grego | 356/326 |
| 5,596,667 A * | 1/1997 | Watanabe | 385/122 |
| 5,623,336 A | 4/1997 | Raab | |
| 6,237,421 B1 * | 5/2001 | Li et al. | 73/800 |
| 6,535,328 B2 * | 3/2003 | Yao | 359/334 |
| 6,608,854 B1 * | 8/2003 | Watanabe | 372/96 |
| 6,813,403 B2 * | 11/2004 | Tennyson | 385/12 |

FOREIGN PATENT DOCUMENTS

| | | |
|---|---|---|
| JP | 4122835 | 4/1992 |

\* cited by examiner

OPTICAL SPECTRUM ANALYZING DEVICE BY MEANS OF BRILLOUIN SCATTERING AND ASSOCIATED MEASUREMENT PROCESS

This application is a 371 of PCT/ES2003/000392, filed Jul. 25, 2003; the disclosure of which is incorporated herein by reference.

FIELD OF THE INVENTION

The present invention refers to an optical signal spectrum analyzing device based on the Stimulated Brillouin Scattering effect and associated measurement process which uses optical signal amplification by means of the same Brillouin Scattering effect. In this device, the Brillouin Scattering effect allows the selective optical amplification of a determined optical spectrum component of the signal to be analyzed, which will be called test signal, for its measurement with a determined dynamic resolution, sensitivity and range.

For this purpose, the test signal is introduced into an optical fiber together with a narrowband optical signal, which will be called probe signal, centered at a determined wavelength, which is sent in the direction opposite to that of the test signal. Due to the Brillouin effect, when both signals interact inside of the fiber, an output signal traveling in the opposite direction of the probe signal is generated, and whose intensity is determined by the product of the intensities of the first two signals, such that it is possible to obtain a spectral component measurement of said test signal from said output signal, this component being determined by the central wavelength of said probe signal.

BACKGROUND

European patent EP-1-199549-A1 discloses a device using the Brillouin Scattering effect in an optical fiber for carrying out spectroscopic measurements and constitutes the most recent background with an invention field similar to the one disclosed in the present document.

The main innovative step included in the present invention is the use of the optical amplification by means of the Brillouin Scattering effect, combined with the spectral selectivity provided by the same Brillouin Scattering effect as a consequence of the narrowness of the Brillouin gain curve in an optical fiber.

To obtain the Brillouin amplification effect, the test and probe signals are introduced into the optical fiber in which the effect occurs on opposite ends and in opposite propagation directions, unlike the configuration disclosed in European Patent EP-1-199549-A1. This difference is associated with significantly different operation principles of the device which permit obtaining a high optical amplification level of the test signal together with the high Brillouin effect spectral selectivity.

The resolution in the optical spectral measurement with the device disclosed in the present invention is determined by the Brillouin gain curve spectral width, and it is not based on any passive filtering of the test signal by means of systems with diffraction gratings, Fabry-Perot interferometers or other similar systems.

DESCRIPTION OF THE INVENTION

Under certain conditions, when a light beam or optical signal is propagated with enough intensity by a material means, a non-linear response of the means occurs, giving way to the occurrence of the effect known as Spontaneous Brillouin Scattering. Due to this effect, one part of the light of the incident signal is diffused in a direction opposite to that of the incident signal, with a small wavelength shift ($\Delta\lambda D$) of the backscattered beam with regard to the incident beam. This shift is due to the Doppler effect.

In order for the Brillouin Scattering effect to occur, as for other non linear effects, a very high optical power spatial density is required in the material means, such as that which is currently easily obtained in single-mode optical fibers, in which power of up to 1 W can be injected continuously, in areas of approximately 50-100 $\mu m^2$.

Furthermore and specifically, the Brillouin Scattering effect requires a high degree of spatial coherence of the incident signal. The degree of coherence necessary for generating the Brillouin Scattering can be easily obtained by using lasers such as external cavity semiconductor lasers conventionally used as tunable sources in optical fiber characterization equipment.

With a sufficient degree of coherence in the light source, the Spontaneous Brillouin Scattering phenomenon occurs in a single-mode optical fiber when the optical power level exceeds a certain threshold level of approximately several miliwatts of power in the fiber.

When, in addition to the incident signal (which is called the probe signal), a second signal, called the test signal, propagated in the opposite direction of the incident signal, is introduced in the same optical fiber, the so-called Spontaneous Brillouin Scattering effect occurs.

Under these circumstances, a small power level in the second signal or test signal, if it has the suitable spectral features, produces a strong reduction in the threshold level so that Brillouin Scattering occurs, such that the magnitude of this scattering intensifies in response to the stimulus provided by the test signal.

The magnitude of the power backscattered by means of the stimulated Brillouin effect is directly determined by the much weaker intensity of the test signal. If the length of interaction between the probe signal and the test signal is big enough, the light beam or optical signal resulting from Brillouin Scattering can have an intensity comparable to that of the probe signal, but controlled by the magnitude of the test signal stimulating it. Therefore, a Brillouin Scattering Optical Amplification effect occurs.

Brillouin Scattering Amplification has a selective character in wavelength: it occurs exclusively in a narrow spectral range (having an approximate width of 0.05 pm in the near infrared zone, $\lambda \sim 1.5$ $\mu m$) around the wavelength determined by the probe signal, slightly shifted by the aforementioned Doppler effect (with an approximate value of 0.1 nm in silica optical fibers and in said near infrared).

By modifying the probe signal wavelength, different spectral components of the test signal are amplified. Wavelength sweep of the probe signal acts as a tunable amplifying probe on the test signal spectrum.

The optical spectra measurement process according to the present invention is based on the Brillouin Scattering Selective Optical Amplification of a narrow range of the test signal spectrum centered on the wavelength fixed by the probe signal (except the shift due to Doppler effect), such that wavelength sweep of the probe permits obtaining a broad range of the test signal spectrum.

The optical spectrum analyzing device by means of Brillouin Scattering and associated measurement process object of the present invention, achieves the proposed objectives as it incorporates a narrowband tunable optical source, an optical fiber link, an optical circulator permitting access to said link on one of its ends, a second optical access on the other end of said optical fiber link, a detection system and a control and data collection system.

Said optical fiber link is susceptible to receiving, through said optical circulator, an optical probe signal in turn coming from said tunable optical source.

On the other hand, said fiber link is susceptible to receiving, through said second access, an optical test signal to be measured coming from an outside source.

Said fiber link is the suitable material means for the interaction due to Brillouin effect between the probe signal and test signal, thus obtaining, due to said optical circulator, an optical output signal, which is then carried to said detection system.

Once a proportional electric signal has been detected and obtained, this electric signal is applied to said control and data collection system in order to obtain a spectral component measurement of said test signal corresponding to the wavelength of said probe signal.

Furthermore, the test signal spectrum is obtained by means of said control system, which carries out a wavelength sweep of the probe signal and the composition of the measurements obtained according to said sweep.

The device according to the present invention incorporates the following components to improve its working features:
   i. an optical isolator in said second access of the optical fiber for preventing any optical signal output which could influence the external test signal generating source; and
   ii. a polarization controller located between said circulator and said fiber link for preventing the loss of efficiency in the interaction by Brillouin effect due to the difference in the optical test and probe signal polarization conditions.

Furthermore, the device of the present invention can optionally include the following elements in order to reach the last limits with regard to its performances:
   iii. an optical amplifier located at the outlet of said tunable optical source for increasing the probe signal applied intensity and thereby improving the device sensitivity and the dynamic measurement range; and
   iv. one or several amplitude or polarization modulators permitting the use of a synchronous detection system in the measurement process, for the purpose of reaching the maximum sensitivity degree possible in the measurement.

The optical signal spectroscopic measurement process for selective optical signal Brillouin Scattering amplification includes the following steps:
   i. introducing an optical probe signal coming from an optical source or tunable laser in one end of an optical fiber link,
   ii. introducing an optical test signal to be analyzed and object of the measurement, coming from an external source, which crosses an optical isolator prior to its input in the opposite end of the optical fiber,
   iii. optimizing the probe signal polarization alignment with that of the test signal by means of a polarization controller located between the optical circulator and the probe signal input in the optical fiber link,
   iv. interacting the probe signal and test signal in the optical fiber link, generating an output signal,
   v. separating the probe signal and output signal by means of an optical circulator located at the probe signal input end in the optical fiber link,
   vi. detecting the output signal by means of a direct light detection system, and
   vii. analyzing and collecting data by means of a control system connected to the optical source or tunable laser and to the detection system.

In order to reach maximum yield in the measurement process, the following final steps can optionally be carried out:
   viii. amplifying the probe signal by means of an optical amplifier after its output from the optical source or tunable laser and prior to the probe signal input in the optical circulator, and
   ix. amplitude or polarization modulation of the probe signal or of the test signal or both, synchronously with the detection system.

DESCRIPTION OF THE DRAWINGS

The invention will be better understood from the detailed description of several embodiment examples thereof with reference to the attached drawings, where:
   i.

DESCRIPTION OF A PREFERRED EMBODIMENT EXAMPLE

Figure 1:
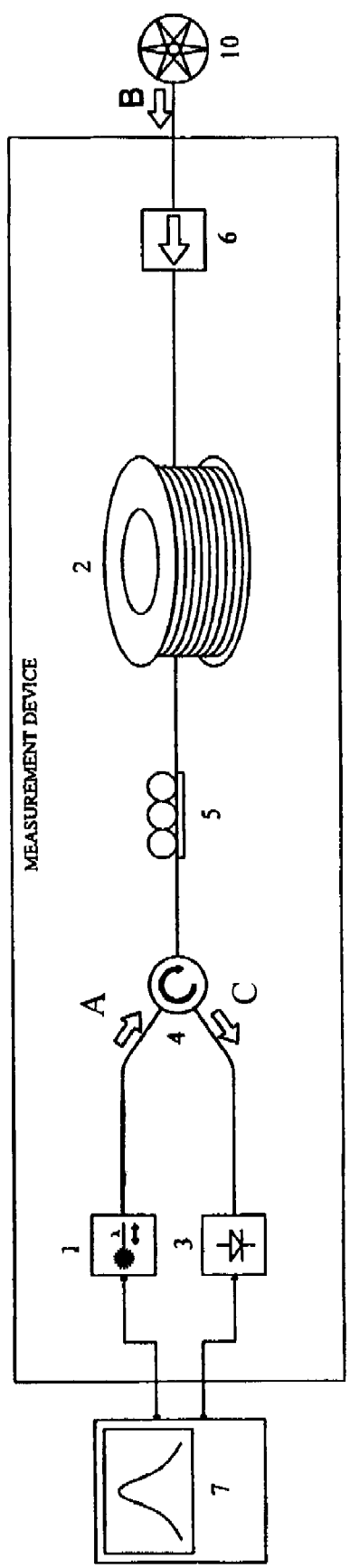
FIG. 1 schematically shows the interconnection circuit with the basic elements comprised in the device of the present invention,
   ii.

By that previously described and making reference to the figures, the present invention refers to an optical spectrum 12 analyzing device by Brillouin Scattering Amplification and associated measurement process comprising a narrowband tunable optical source 1, an optical fiber link 2, an optical circulator 4, a polarization controller 5, an optical isolator 6, a detection system 3 and a control and data collection system 7, as can be seen in FIG. 1.

With regard to the source 1 and the probe signal A generated by that source, the following considerations must be taken into account:
   i. The probe signal A must have an energetic spectral density sufficient for triggering the Brillouin Scattering phenomenon in the selected material means (in the range of miliwatts of power in an optical fiber).
   ii. The probe signal A must have a narrower spectral width than that of the Brillouin gain ($g_B$) spectral profile, so that the latter is the one truly determining the spectrometric technique resolution (of approximately 0.05 pm for the near infrared zone: $\lambda \sim 1.5$ µm).
   iii. The generating source 1 of the probe signal A must, in practice, permit the probe signal central wavelength variation, that is, it must be tunable. Thus, the output signal can be moved through different points of the spectrum, which permits knowing the intensity level that the test signal has around different wavelengths.
   iv. The tuning features of the source 1 directly determine the spectral range, accuracy, reproducibility and similar corresponding features of the measurement technique. Nowadays, a tunable external cavity semiconductor laser is able to provide much smaller spectral widths than the measurement resolution and allows tuning ranges of approximately 100 nm with high accuracy and repeatability.

With regard to the interaction material means 2, optical fiber, the following considerations must be taken into account:

i. The optical fiber 2 to use as material means for the interaction by Brillouin effect must be of the single-mode type in the range of the measurement wavelengths, in order to preserve spatial coherence of the light beams, the probe and test signals, in interaction.

ii. The efficiency of the effect is inversely proportional (at the same optical power of the beams) to the effective area of the light beams in interaction. Therefore, the smaller the area of the optical fiber core, the greater the efficiency. Specifically, for $\lambda \sim 1.5$ μm, it is preferable to use "dispersion-shifted" type optical fiber or the like, since it has an effective area that is approximately half that of the standard single-mode fiber.

iii. The length of the optical fiber 2 to be used is kilometers long in order to obtain maximum yield in the Brillouin Amplification process accumulated along the fiber length.

With regard to the optical circulator 4, it is intended for decoupling the two light propagation directions in the end of the fiber without a significant intensity loss, which is necessary for being able to introduce the probe signal A on one hand, and for obtaining the output signal C on the other, with greater efficacy than an optical fiber coupler.

With regard to the polarization controller 5 located between said circulator 4 and said fiber link 2, it permits preventing the loss of efficiency in the Brillouin Scattering effect caused by the different possible polarizations of the optical signals in interaction.

With regard to the optical isolator 6, it is used to prevent any optical signal output which could influence the test signal source 10.

In order to carry out the measurement by means of the spectral analysis device by means of Brillouin Scattering, the fiber link 2 receives on one end, through said circulator 4, an optical probe signal A in turn coming from said tunable optical source 1. On the opposite end it receives, through said isolator 6, an optical test signal B to be measured coming from an external source 10.

Said fiber link 2 is the suitable material means for interaction by Brillouin effect between the probe signal A and test signal B, obtaining by means of said optical circulator 4 an optical output signal C, which is carried to said detection system 3.

A direct light detection chain is posed as a detection system 3, with no special requirements with regard to dynamic response or sensitivity. Optical signal detection can be done at a low frequency or "zero frequency"; therefore, a detection chain with especially quick response times is not needed.

Once an electric output signal proportional to said output signal C has been detected and obtained, this electric signal is applied to said control system 7 for obtaining a test signal B component measurement according to the wavelength of probe signal A.

Furthermore, the spectrum 12 of the test signal B is obtained by means of said control system 7, which carries out a wavelength sweep 11 of the probe signal A and the graphic composition of the measurements obtained according to said sweep 11 is also obtained.

The simple use of an oscilloscope for visualizing the electric signal extracted from the detector where the output signal acts, synchronized with an electric signal for controlling the continuous wavelength sweep 11 of the probe signal, permits obtaining a representation of the test signal B spectroscopic profile in real time.

Figure 3:
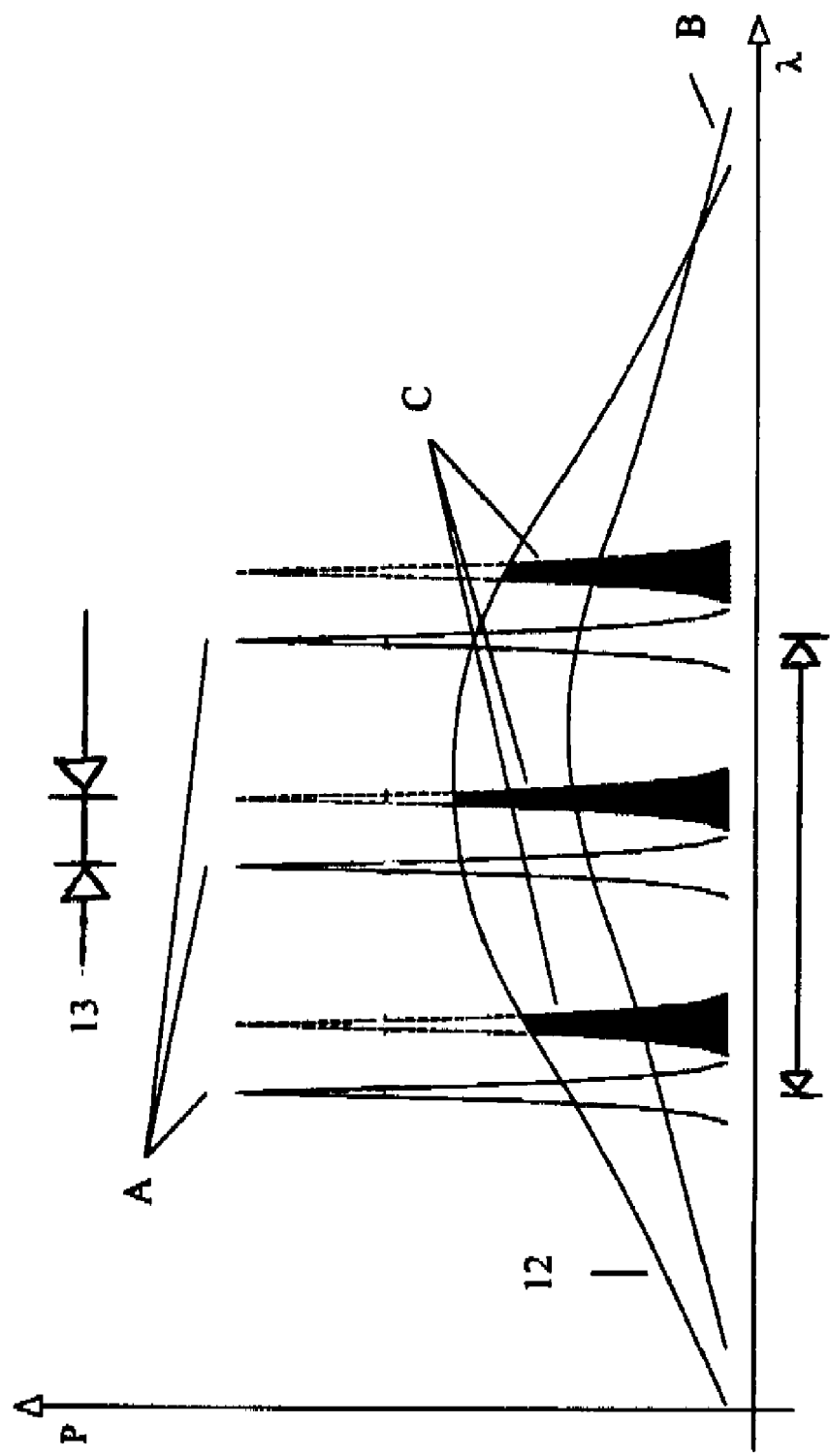
FIG. 3 shows a graphical representation of the optical spectra of the signals intervening in the device, according to the probe signal wavelength sweep.

According to the process to be carried out with the device of the present invention, the spectrum 12 of test signal B is obtained by means of the wavelength sweep 11 of the tunable laser emission. The detected output signal C corresponds to the magnitude of the test signal B spectral component, amplified (by Stimulated Brillouin effect) with a gain which depends on the intensity of the probe signal A coming from the tunable source. Specifically, at each point of the fiber where the interaction occurs, the reflected contribution to the output signal is determined by a product $g_B \cdot I_P(\lambda_P) \cdot I_T (\lambda_P - \Delta\lambda_D)$, where $g_B$ is a Brillouin gain coefficient (typical of the interaction fiber), and $I_P(\lambda_P)$, $I_T(\lambda)$ represent the probe and test signal intensities, respectively, as functions of the wavelength, $\lambda$. The intensity $I_T (\lambda_P - \Delta\lambda_D)$ of the test signal is the one corresponding to the probe ($\lambda_P$) wavelength, except for the aforementioned Doppler effect shift 13 ($\Delta\lambda_D$) (see FIG. 3).

Furthermore, the device of the present invention can incorporate a series of optional elements which allow reaching the maximum performances compatible with the measurement process fundamentals. These optional elements are:

i. an optical amplifier 8 located at the outlet of said tunable optical source 1 to increase the probe signal A applied intensity; and ii. a first amplitude or polarization modulator 9, synchronously working with the detection system 3, located between the polarization control 5 and the fiber link 2. As an alternative, a second amplitude or polarization modulator 14, also synchronously working with the detection system 3, can be included between the isolator 6 and the fiber link 2 instead of the first modulator. It is also possible to use a first modulator 9 between the polarization control 5 and the fiber link 2, and a second modulator 14 between the isolator 6 and the fiber link 2. In the first case, and if polarization modulation is used, this modulation could be carried out by means of the polarization controller 5 instead of by the first modulator 9.

A first modulator 9 with polarization modulation will preferably be used working synchronously and located, as previously mentioned, between the polarization control 5 and the optical fiber link 2.

The use of an optical amplifier 8 has the object of achieving high levels in the output signal, starting from weak test signal levels ($I_T$), by means of an increase in the factor ($I_P$) corresponding to the probe signal intensity.

Figure 2:
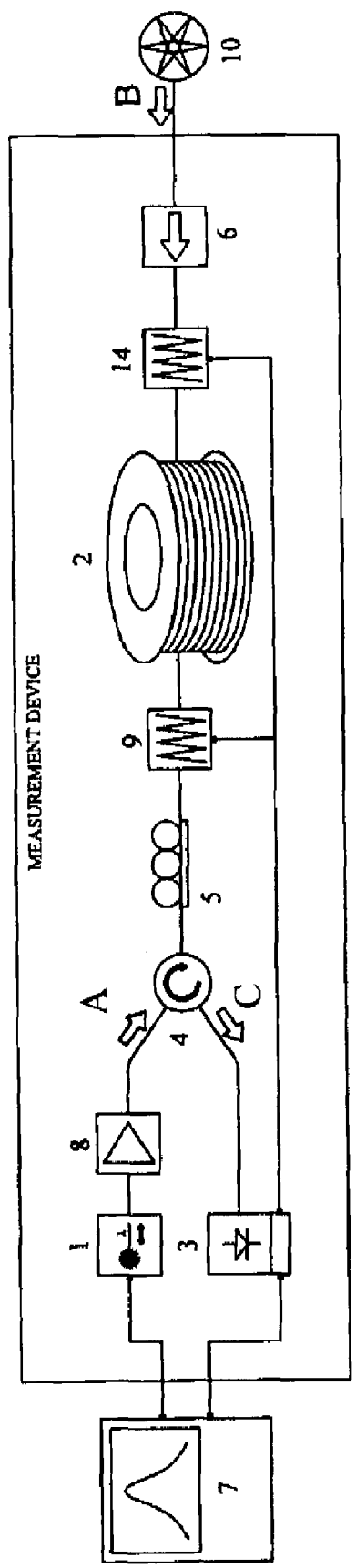
FIG. 2 schematically shows an alternative to the circuit in FIG. 1 with the inclusion of optional elements such as the optical amplifier 8 and the external modulators 9, and
   iii.

On the other hand, in order to increase, where applicable, the detection chain dynamic range, it is possible to modulate either the probe signal A, or the test signal B, or both signals. These modulations can be amplitude or polarization modulations (periodical evolution of the polarization condition) by means of a specific system (9, 14 in FIG. 2). In any case, the modulation is transferred to the intensity of the detected output signal C, thus allowing an improvement of the signal-to-noise ratio by means of synchronous detection techniques. In the case of polarization modulation, the dependence of the Brillouin Scattering efficiency on polarization provides the modulation transfer mechanism to the detected output signal C. If the test signal B is modulated, it is possible to discriminate the signal from the Spontaneous Brillouin Scattering contribution by means of synchronous detection. If the probe signal A is modulated, it is possible to discriminate the signal from the continuous power associated to the direct light transmitted with the test signal B. Finally, if both signals A and B are modulated, it is possible to discriminate the signal from any other background contribution present in the detected signal by detecting at a sum (or difference) frequency of the modulation frequencies.

Finally, the optical spectrum analyzing device by means of Brillouin Scattering Optical Amplification effect disclosed in the present invention reaches the following performances in the measurement:
  i. a high spectral resolution exclusively determined by the width associated to the Brillouin effect (about 0.05 pm for the near infrared zone, that is, $\lambda \sim 1.5$ µm);
  ii. a high sensitivity such that the minimum detectable power is of about 1 nW/pm (for about 1 ms response times in the detection chain); and
  iii. a wide dynamic range, greater than 80 dB, adjusting system sensitivity by means of the total gain level in the Brillouin Scattering Amplification.

The optical signal spectroscopic measurement process for the selective optical amplification of signals by means of Brillouin Scattering according to the present invention, includes the following steps:
  i. introducing an optical probe signal A coming from an optical source or tunable laser 1 in one end of an optical fiber link 2,
  ii. introducing an optical test signal B to be analyzed and object of the measurement, coming from an external source 10, which crosses an optical isolator 6 prior to its input in the opposite end of the optical fiber 2,
  iii. optimizing the probe signal A polarization alignment with that of test signal B, by means of a polarization controller 5 located between the optical circulator 4 and the probe signal A input in the optical fiber link 2,
  iv. interacting the probe signal A and the test signal B in the optical fiber link 2, generating an output signal C,
  v. separating the probe signal A and the output signal C by means of an optical circulator 4 located on the probe signal A input end in the optical fiber link 2,
  vi. detecting the output signal C by means of a direct light detection system 3, and
  vii. analyzing and collecting data by means of a control system 7 connected to the optical source or tunable laser 1 and to the detection system 3.

Furthermore, the following phases can optionally be carried out:
  viii. amplifying the probe signal by means of an optical amplifier 8 after its output from the optical source or tunable laser 1 and before the probe signal A input in the optical circulator 4, and
  ix. probe signal A amplitude or polarization modulation by means of a first modulator 9 located between the polarization control 5 and optical fiber link 2, and synchronously working with the detection system 3.

This last step can be replaced or complemented with an amplitude or polarization modulation step of test signal B, by means of a second modulator 14 located between the optical isolator 6 and the optical fiber link 2, and synchronously working with the detection system 3.

The invention claimed is:

1. A device for optical spectrum analysis by Brillouin Scattering, the device comprising:
  an optical source
  an optical fiber link
  an optical circulator that accesses said optical fiber link by a first end of said optical fiber link,
  an optical access that comprises an optical isolator,
  a polarization controller arranged between said optical circulator and said optical fiber link,
  a detection system, and
  a control system wherein:
    said optical fiber link receives an optical probe signal from said optical source via said optical circulator and an optical test signal whose spectrum is to be measured from an external source via said optical access,
    said probe signal is input into said optical fiber link at said first end of said optical fiber link,
    said test signal is input into said optical fiber link at a second end of said optical fiber link that is opposite to said first end of said optical fiber link,
    said fiber link is a material that is suitable for a Brillouin effect interaction between the probe signal and the test signal,
    an optical output signal obtained by said optical circulator is carried to said detection system, and an electric signal derived from said detection system is applied to said control system, and
    the device provides a spectral component measurement of the test signal based on a wavelength of the probe signal and obtains a spectrum of the test signal.

2. A device according to claim 1, wherein said optical source is a high coherence, narrowband, tunable, and external cavity semiconductor laser.

3. A device according to claim 1, wherein said device further comprises an optical amplifier arranged at an outlet of said tunable optical source.

4. A device according to claim 1, wherein said device further comprises a first modulator that works synchronously with the detection system.

5. A device according to claim 4, wherein the first modulator is arranged between the polarization controller and the fiber link, and the first modulator carries out modulation on the probe signal.

6. A device according to claim 5, further comprising a second modulator arranged between the fiber link and the isolator, wherein the second modulator carries out modulation on the test signal.

7. A device according to claim 4, wherein the first modulator is arranged between the polarization controller and the fiber link, and a second modulator is arranged between the fiber link and the isolator.

8. A device according to claim 7, wherein at least one of the first modulator and the second modulator carries out an amplitude or a polarization modulation.

9. A device according to claim 8, wherein the first modulator carries out a polarization modulation.

10. A device according to claim 1, wherein a spectral resolution is limited by a Stimulated Brillouin effect spectral width.

11. A device according to claim 10, wherein said spectral resolution reaches a minimum value of about 0.05 pm at a wavelength of approximately 1.5 µm.

12. A device according to claim 1, wherein a sensitivity reaches a value of about 1nW/pm for response times in a detection chain of approximately 1 ms.

13. A device according to claim 1, wherein a dynamic range reaches a value of approximately 80 dB, and a system sensitivity is adjusted by changing a total gain level in the Brillonin Scattering Amplification.

14. A device according to claim 1, wherein the optical fiber is a single-mode fiber throughout a range of measurment wavelenghts.

15. A device according to claim 1, wherein the polarization controller exercises the functions of a first modulator that modulates the probe signal.

16. A device according to claim 1, wherein the detection system is a low frequency detection system.

17. A process for optical signal spectroscopic measurement of the selective optical amplification of signals by Brillouin Scatter, the process comprising:

introducing an optical probe signal into a first end of an optical fiber link, introducing an optical test signal to be analyzed into a second end of the optical fiber link, wherein the first end of the optical fiber link is opposite to the second end of the optical fiber link, optimizing a polarization alignment of the probe signal with a polarization alignment of the test signal, interacting the probe signal with the test signal to generate an output signal, routing the probe signal and the output signal by an optical circulator, detecting the output signal, and analyzing and collecting data based on the output signal.

18. A measurement process according to claim 17, further comprising amplifying the probe signal before introducing the probe signal into the optical fiber link.

19. A measurement process according to claim 17 or 18, further comprising modulating the probe signal.

20. A measurement process according to claim 17 or 18, further comprising modulating the test signal.

21. A measurement process according to claim 17 or 18, further comprising modulating the probe signal and the test signal.

* * * * *